United States Patent [19]

Nakaski et al.

[11] Patent Number: 4,940,069

[45] Date of Patent: Jul. 10, 1990

[54] RUN-FLAT TIRE AND RIM ASSEMBLY FOR ATV

[75] Inventors: Eiji Nakaski, Kakogawa; Yasuo Igarashi, Kawanishi, both of Japan

[73] Assignee: Sumitomo Rubber Industries, Ltd., Hyogo, Japan

[21] Appl. No.: 277,705

[22] Filed: Nov. 30, 1988

[30] Foreign Application Priority Data

Nov. 30, 1987 [JP] Japan ................... 62-304070

[51] Int. Cl.$^5$ ........................................... B60C 15/024
[52] U.S. Cl. .................... 152/544; 152/379.3; 152/546
[58] Field of Search ............... 152/544, 546, 547, 541, 152/379.3, 379.5, 559, 560, 516, 520

[56] References Cited

U.S. PATENT DOCUMENTS 3,915,215 10/1975 Nebout ..................... 152/544 X
4,148,348 4/1979 French et al. ............. 152/544 X

FOREIGN PATENT DOCUMENTS 0167273 1/1986 European Pat. Off. .......... 152/544
58-145508 8/1983 Japan ......................... 152/379.3
8706889 11/1987 PCT Int'l Appl. ............. 152/379.3
8706891 11/1987 PCT Int'l Appl. ............. 152/379.3

*Primary Examiner*—Raymond Hoch
*Attorney, Agent, or Firm*—Birch, Stewart, Kolasch & Birch

[57] ABSTRACT

The invention relates to a run-flat tire and rim assembly for all-terrain vehicles (ATV), wherein the rubber thickness of the tire sidewall is at leat 10 times the diameter of the ply cords of a carcass; the height of the radially outermost end of a tire bead apex from the tire bead base is within a range of 20 to 40% of the section height of the tire; each tire bead has a toe with a protrusion protruded radially inwardly from the bead base and a hump groove axially outward of the protrusion; the bead toe comprises a toe strip having a JIS A hardness of 65 to 95; and the rim is provided with a well in the center portion, a pair of bead seats one on each side of the well, a pair of humps one formed axially inward and adjacent to each bead seat to be engaged with the hump grooves of the tire beads and a pair of grooves one formed axially inward of each hump to receive the protrusions of the tire bead toes.

14 Claims, 4 Drawing Sheets

RUN-FLAT TIRE AND RIM ASSEMBLY FOR ATV

The present invention relates to a run-flat tire and rim assembly for all-terrain vehicles (ATV), wherein the tire is safely prevented from slipping out of the rim, even if the air is released by puncture or the like during running, and which is able to run with a deflated tire.

In a conventional run-flat tire and rim assembly for an ATV, as shown in FIG. 3, the tire 25 is fixed to the rim in such a manner that the bottom surface and outside surface of each bead 20 are pressed against the bead seat and flange of the rim by mean of internal air pressure. Accordingly, when the pressure is lowered, its power of holding the tire on the rim is also lowered. In particular, when the internal pressure is suddenly lowered owing to puncture and the like, if the tire is additionally subjected to a lateral force by the operation of a handler and the like, the beads 20 of the tire would slip out of the bead seats of the rim, which remarkably imperils safety. Furthermore, as the normal air pressure for ATV tires is very low, the slipping-out of the bead from the bead seat occurs easily due to a lateral force owing to an eventual sharp cornering during operation to avoid a possible accident. The above mentioned slipping-out leads to not only a lack of the maneuver stability but also to such a dangerous situation that the tire drops off completely from the rim, particularly a rim which has a rim well.

While in cornering operation, the tire is subjected to a lateral force, which shifts the tread 27 laterally with respect to the rim, and the force is transferred to the tire bead 20 through the carcass 29. Accordingly, the part of the bead adjacent to the ground contacting patch is subjected to an axial force and a moment around the bead, and the heal 20A of the bead would be lifted if the inner air pressure is low. Under such condition, the frictional force between the bead base 20B and the seat, or the only force that holds the beads on the seats would become remarkably reduced, which easily causes the bead to slip off the bead seat and to fall into the rim well.

It is therefore, an object of the present invention to provide a run-flat tire and rim assembly for ATV which can solve the above mentioned problems caused by a sharp cornering operation by the handler, as being a major cause of car accident, under a low inner pressure, and continue to run after puncture.

According to one aspect of the present invention, an assembly comprises a rim and a run-flat tire mounted thereon, wherein the tire comprises a pair of beads with a substantially inextensible bead core; a toroidal carcass of a radial or a bias construction extended across the beads and turned up in both edge portions around the bead cores; a tread disposed radially outward of the carcass; a pair of sidewalls disposed on the outside of the carcass and each extended from each buttress region to the bead region of the tire, the rubber thickness of each sidewall being at least 10 times the diameter of ply cords of the carcass; a pair of bead apexes one disposed radially outside each bead core and extended radially outwardly from the bead core, the radially outward height of the radially outermost end thereof from the bead base being within a range of 20 to 40% of the section height of the tire; and the beads each having a toe disposed axially inward of the bead core, the toe having a protrusion protruded radially inwardly from the bead base at the axially inside of the bead core, and each bead provided with a hump grove (Q) at the axially outside of the protrusion (R), and the rim has a well in the center portion of the rim; a pair of bead seats one on each side of the well; a pair of humps one formed axially inward and adjacent to each bead seat to be engaged with the hump grooves of the tire beads; and a pair of grooves one formed axially inward of each hump to receive the protrusions of the tire bead toes.

An embodiment of the present invention will now be described in detail with reference to the accompanying drawings, in which.

Figure 1:
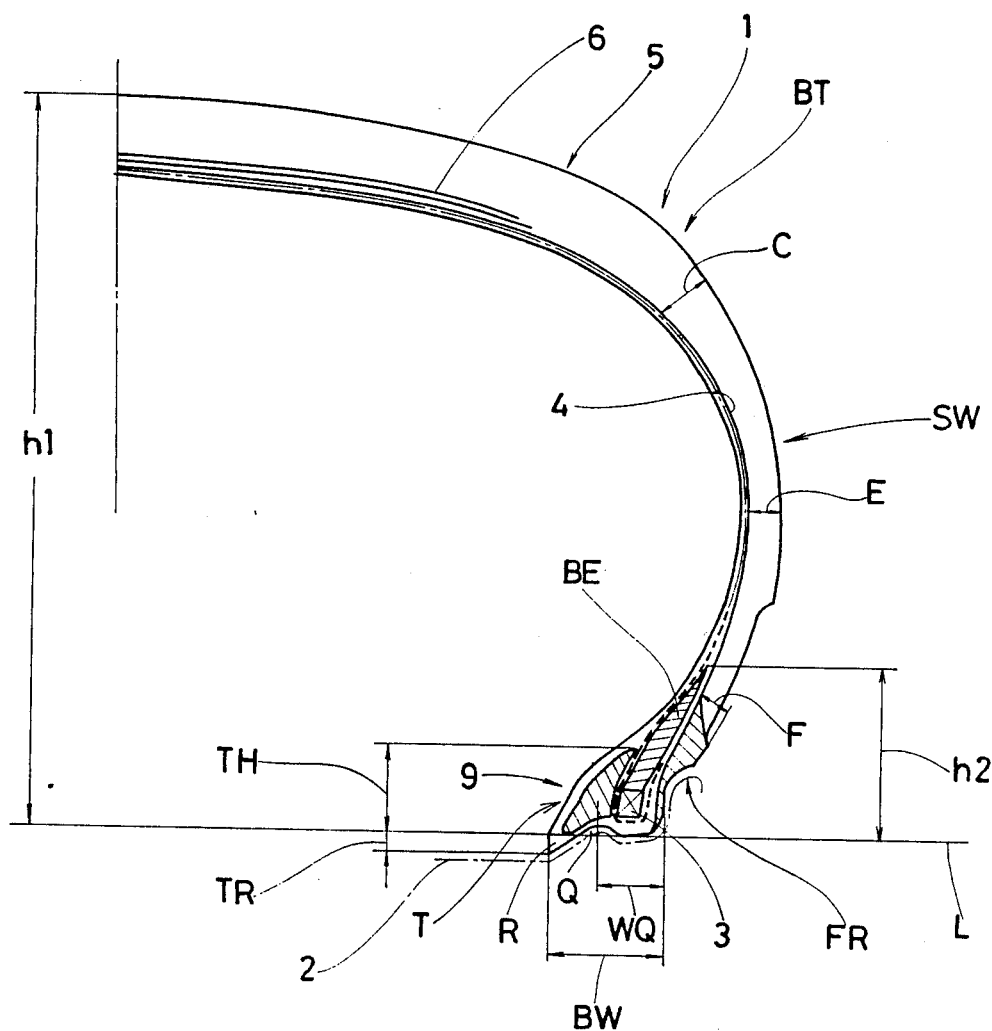
FIGS. 1 and 2 are sectional views showing a tire and a rim according to the present invention, respectively.

In the drawings, the run-flat tire and rim assembly comprises a run-flat tire 1 and a rim 2 on which the tire 1 is mounted.

In FIG. 1, the tire 1 comprises a pair of bead cores 3 one disposed in each bead 9, a toroidal carcass 4 extending across the beads 9, a tread 5 disposed radially outside the crown part of the carcass 4, a pair of sidewalls SW on the outside of the carcass, a belt 6 disposed between the carcass and the tread. Further, each bead region 9 is provided with a toe T with a dove's tail-like protrusion R, and the bead base is grooved to form a hump groove Q.

The carcass 4 is turned up in both edge portions around the bead cores 3 from the inside to the outside thereof to be secured thereto, whereby two turnup portions and a main portion therebetween are formed. In the tire 1 of FIG. 1, the carcass is of a radial construction in which at least one rubberized parallel cord ply is arranged so that the cords are laid at an angle of 70 to 90 degrees with respect to the equatorial plane of the tire.

The carcass ply cords are made of organic fibers such as nylon, polyester, rayon and aromatic polyamide. However, the carcass can also employ a bias construction in which at least two rubberized parallel cord plies are arranged so that the cords of one ply intersect with those of the other ply.

The belt 6 is composed of rubberized cords laid at an angle of 10 to 30 degrees with respect to the equatorial plane of the tire. The belt cords are made of inextensible material such as steel. The belt 6 is preferably extended all over the width of the tread to increase the rigidity of the ground contacting region of the tire, whereby the stability at straight running is improved and the resistance to puncture is increased.

Each sidewall SW is made of rubber and extended from each edge of the tread 5 in the tire buttress portion BT to the clincher part FR of the bead region which contacts with a rim flange 13 when mounted. The thickness of the sidewall is so set that the thickness C at the buttress portion BT, the thickness E at the maximum tire section width portion, and the thickness F at the clincher part FR are at least 10 times the diameteer of the carcass ply cord, whereby the vertical stiffness of the sidewall SW is maintained at a certain level, even if the internal air is released. When they are less than 10 times, it is impossible to get a enough vertical stiffness to run under deflation. The elastic modulus at 100% elongation, of the sidewall rubber is preferably more than 12 kg/sq.cm.

In each bead region 9, a bead apex BE is disposed radially outside the bead cores 3 between the turnup portion and main portion of the carcass 4. The bead apex BE is made of a rubber compound preferably having a JIS A hardness of 65 to 95.

The bead apex BE extends radially outwardly from the bead core, and the height h2 of the radially outermost end thereof from the bead base L is within a range of 20 40%, more preferably within a range of 20 to 30% of the tire section height h1 from the same bead base L. When it is less than 20%, the lateral stiffness of upper bead part over the rim flange 13 becomes low, and the bead portion of the deflated tire will fatigue remarkably. On the contrary, when it is more than 40%, under the normal state, the stress concentrate is apt to occur at the radially outermost end of the bead apex BE, which causes the separation of rubber.

Further, as mentioned above, in each bead region 9, the bead toe T is formed axially inside the bead core 3 along the axially inside of the carcass main portion, and extended radially inwardly therefrom. The bead toe T of FIG. 1 includes a toe strip (hatched part) as a core of the toe being harder than the surrounding elastomer. The toe strip is preferably made of a hard rubber compound having JIS A hardness of 65 to 95. For the toe strip, one made of a plastic material, or one having fibers or the likes may be used to further increase the engagement of the tire with the rim. Further, for the bead toe T, one made of a single elastomer without any core may be employed.

The toe strip is disposed axially inside the bead core 3 along the axially inside of the carcass main portion, and extended radially and axially inwardly therefrom, that is, obliquely to the bead base level L. Therefore, in this example, the surrounding elastomer is protruded from the bead base L, and this protrusion R forms the tip of the bead toe. Accordingly, the protrusion R becomes softer than the toe strip.

Further, the bead toe T is prferably reinforced by a fiber cord reinforcing layer disposed along the profile of the whole bead, that is, including the toe from the inside to the outside thereof.

Figure 2:
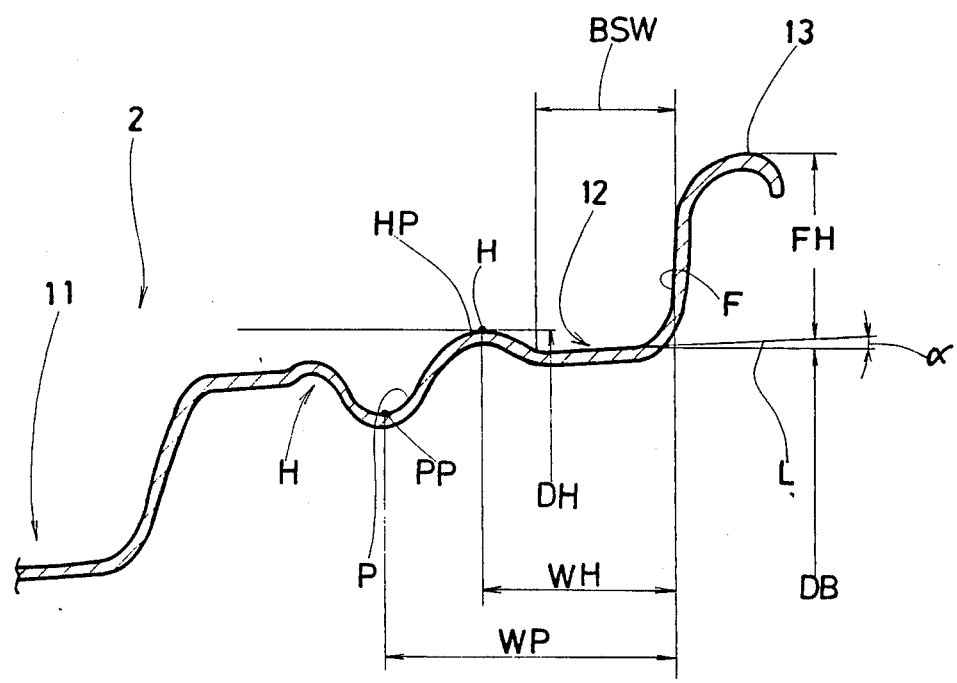

FIG. 2 shows a rim according to the present invention. In FIG. 2, the rim 2 is provided with; a well 11 in a central portion of the rim; a pair of bead seats 12 one on each side of the well; a pair of rim flanges 13 extending radially outwardly one from the axially outward end of each bead seat 12. And further, in each of the portions between the well and the bead seats, a hump HP adjacent to the axially inner end of the bead seat 12 and a circumferentially extending groove P located axially inward of the hump are formed to fit with the hump groovw (Q) and the protrusion (R) of the tire bead toe T, respectively.

The bead seat 12 is tapered at an angle (alfa), and the resultant down slope is smoothly connected with the hump HP by an arc, and also the hump HP and the groove P are connected smoothly with each other.

The outer diameter DH of the hump HP is set to be larger 1.5 to 5 mm than the bead diameter DB or the rim diameter, that is, the diameter of the above-mentioned bead base L.

Figure 3:
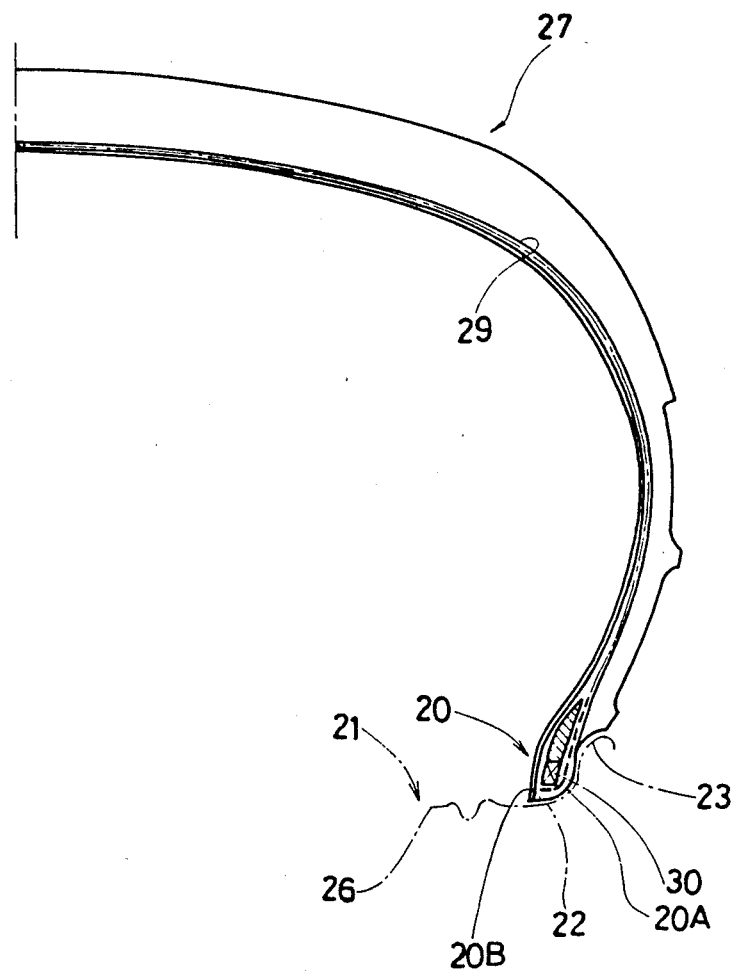
FIG. 3 is a sectional view showing a conventional tire for ATV.
Figure 4:
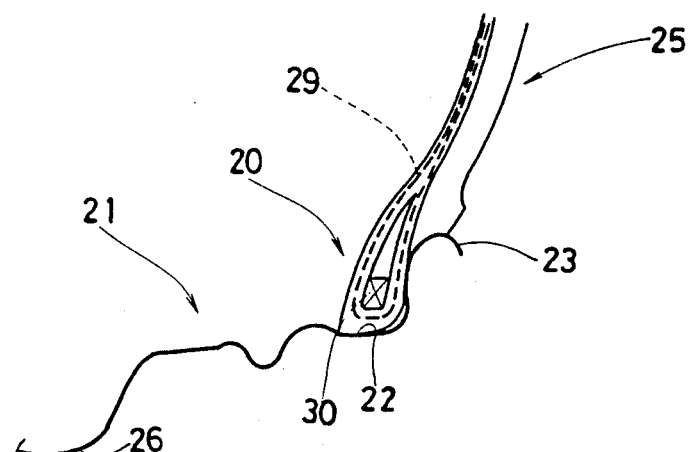
FIG. 4(a) is a sectional view showing one of the bead regions of the assembly of the run-flat tire and the rim of FIGS. 1 and 2.
FIG. 4(b) is a sectional view showing an assembly of the conventional tire of FIG. 3 and the rim of FIG. 2 according to the invention.
Figure 4:
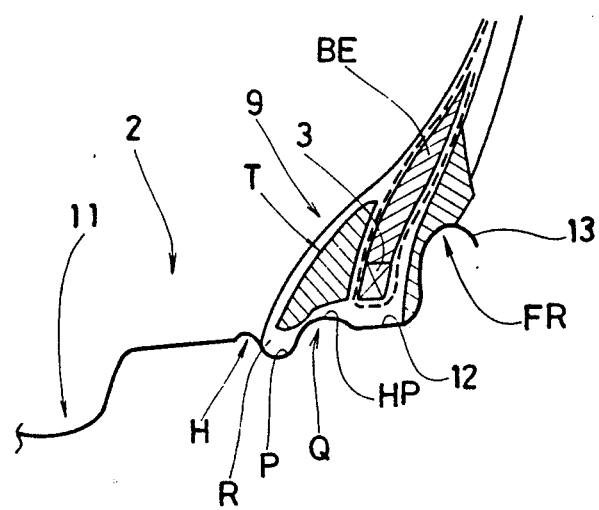

The width BSW of the bead seat 12 is set to be substantially equal to the width of the bead of a standard tire of the identical size, so that such standard tires as shown in FIG. 3 can be mounted on the rim 2.

The width BW of the tire bead base is set within a range of 2.4 to 2.7 times the width BSW of the bead seat 12, and the axial distance WP between the rim flange 13 and the groove P is set to be substantially equal to, but little shorter than the bead base width BW to fit the protrusion R of the tire bead toe T with the groove P.

The radially inward height TR of the protrusion R of the bead toe T from the bead base level L is set to be in a range of 2 5% of the tire section height h1.

The height TH of the radially outermost end of the above-mentioned toe strip is in a range of 120 to 150% of the flange height FH. When it is under 120%, the rigidity in the longitudinal direction thereof becomes insufficient for maintaining the force to push the protrusion R into the groove P. On the other hand, when it is over 150%, the work of mounting the tire on the rim becomes difficult.

As the tire 1 is constructed as above, it can be mounted on the rim 2 by a conventional way, for example, setting the beads 9 into the rim well 11 over the rim flange 13, and then applying air through the value. Accordingly, the air presses the beads 9 against the bead seats 12 and flanges 13 over the hump HP, and the protrusion R of the bead toe T is pushd into the groove P, whereby the beads are firmly held on the rim 2.

Further, by disposing the hard toe strip in the bead region, the bead toe becomes rigid in the longitudinal direction of the toe strip, but in a direction perpendicular to the longitudinal direction, the bead toe becomes flexible. And further, the protrusion R is softer than the toe strip, and the toe strip is terminated at the bead base level L, which allows a easy tire fitting work, but the tire beads are not allowed to be easily unseated under low pressure, because when an axially inward force is act on the bead, the toe strip gives a substantially radially and axially outward force to the bead core 3, which prevents the axially inward movement of the bead and increases the retaining force of the bead on the rim.

In addition, it is possible for the wheel-rim according to the invention to fit not only the above-mentioned run-flat tire but also a standard tire by only setting its bead on the bead seat 12 of the rim as usual. Even in case the standard tire, the wheel rim is safely used therefor.

Assemblies A and B of which the specifications are given in Table 1, were tested for the resistance to unseating (a force by which the bead is slipped out from the bead seat), the plunger resistance (a resistance to puncture), the rolling resistance and the ability to run flat (a runable distance under a deflation of air pressure 0 kg/sg.cm).

The test results are set out in Table 2, wherein each value is expressed by an index based on the assumption that the assembly B of a conventional tire of FIG. 3 and the rim of FIG. 2 is 100, and the larger the value the better the performance.

TABLE 1

| ASSEMBLY | A | B |
|---|---|---|
| TIRE | FIG. 1 | FIG. 3 |
| Size | 25 × 12.00-9 | 25 × 12.00-9 |
| Section height mm | 180 | 180 |
| Sidewall Thickness | | |
| C mm | 7.0 | 4.5 |
| E mm | 7.0 | 4.5 |
| F mm | 9.0 | 5.0 |

TABLE 1-continued

| ASSEMBLY | A | B |
|---|---|---|
| 100% modulus kg/sq · cm | 15 | 12 |
| Bead | | |
| Height mm | 54 | 15 |
| Hardness JIS-A | 85 | 85 |
| Belt | | non |
| Cord | steel/2 | |
| Cord angle deg | 15 | |
| Carcass ply | radial | bias |
| Cord | polyester 1000d/2 | polyester 1000d/2 |
| Cord angle deg | 90 | 45 |
| Toe strip | | non |
| Hardness JIS-A | 85 | |
| Height TH mm | 20 | |
| BW/BSW | 27/11 = 2.45 | |
| WQ/BSW | 15/11 = 1.36 | |
| RIM | FIG. 2 | FIG. 2 |
| Size | 9 × 9.0 | 9 × 9.0 |
| Flange height FH mm | 16 | 16 |
| WH/BSW | 15/11 = 1.36 | |
| WP/BSW | 24/11 = 2.18 | |

TABLE 2

| ASSEMBLY | A | B |
|---|---|---|
| Plunger resistance *1 | 280 | 100 |
| Unseating resistance *2 | 615 | 100 |
| Rolling resistance *3 | 54 | 100 |
| Run flat | over 100 km at 40 km/h | |

Test condition

| | | |
|---|---|---|
| *1 - | Internal air pressure: | 0.15 kg/sq · cm |
| | Diameter of plunger: | 8 mm |
| *2 - | Internal air pressure: | 0.15 kg/sq · cm |
| | Lubricant: | Water |
| *3 - | Internal air pressure: | 0.15 kg/sq · cm |
| | Speed: | 80 km/h |
| | Load: | 80 kg |

As described above, in the present invention, the rim is provided with grooves, and the tire is provided in the bead region with the toe strip to form a bead toe with a protrusion. Accordingly, the retaining force of the run-flat tire on the rim will be increased, and there is no possibility of the tire slipping out from the rim owing to a quick handling under low air pressure, and further, the ability to run-flat under the deflated state with no air pressure is improved by the stiff reinforced sidewalls of the tire.

Further, the hump groove and the hump can be modified in various shape for the sake of the prevention of slipping out of the tire from the rim.

We claim:

1. An assembly of a run-flat tire and a rim for all-terrain vehicles, said tire comprising;
   a pair of beads having substantial inextensible bead cores;
   a toroidal carcass comprised of ply cords and having a radial construction, said carcass extending across the beads and being turned up at both edge portions around said bead cores;
   a tread disposed radially outward of said carcass;
   a pair of sidewalls disposed on the outside of said carcass, each of said sidewalls extendng from an end of the tread to the bead of the tire, the rubber thickness of each sidewall being at least 10 times the diameter of the ply cords of said carcass;
   a pair of bead apexes each disposed radially outside each of said bead cores so as to extend radially outwardly from said bead cores, a radially outward height of the radially outermost end of said bead cores from a heel point of the bead being within a range of 20 to 40% of the section height of the tire; and
   said beads each having a bead toe disposed axially inward of said bead cores, said bead toe having a protrusion protruding radially inwardly from a bead base defined as a radial inward surface of the bead under the bead core, and each bead being provided with a hump groove between the bead base and the protrusion, said rim having:
   a well in the center portion of the rim;
   a pair of bead seats one on each side of side well;
   a pair of humps each formed axially inward and adjacent to each bead seat to be engaged with said hump grooves of the tire beads; and
   a pair of groove each formed axially inward of each hump to receive said protrusions of the tire bead toes
   said bead toe comprising a toe strip made of a hard rubber compound having a JIS A hardness of 65 to 95 degrees, and a height of the toe strip from the bead base being in a range of 120 150% of the height of a flange of the rim from the bead base; and
   said bead having a width in an axial direction being in a range of 2.4 to 2.7 times the width of the bead seat.

2. An assembly as set forth in claim 1, wherein the radially inward height of said protrusion of each tire bead toe from the bead base is in a range of 2 to 5% of the section height of the tire from the bead base.

3. An assembly as set forth in claim 1, wherein the width of the bead seats and the diameter of the rim is set so as to be able to mount a standard tire thereon.

4. An assembly as set forth in claim 1, wherein at least one rubberized ply cord is arranged so that the cords are laid at an angle of 70 to 90 degrees with respect to the equatorial plane of the tire.

5. An assembly as set forth in claim 1, wherein said tire includes a belt of rubberized belt cords laid at an angle of 10 to 30 degrees with respect to the equatorial plane of the tire.

6. An assembly as set forth in claim 5, wherein said belt cords are formed from an inextensible material and the belt extends over the width of the tread.

7. An assembly as set forth in claim 1, wherein the rubber of said sidewalls has an elastic modulus at 100% elongated of more than 12 kg/sg. cm.

8. An assembly as set forth in claim 1, wherein said radially outward height of the radially outermost end of said bead cores from a heel point of the bead is within a range of 20 to 30% of the section height of the tire.

9. An assembly of a run-flat tire and a rim for all-terrain vehicles, said tire comprising;
   a pair of beads having substantially inextensible bead cores;
   a toroidal carcass comprised of ply cords and having a bias construction, said carcass extending across the beads and being turned up at both edge portions around said bead cores;
   a tread disposed radially outward of said carcass;
   a pair of sidewalls disposed on the outside of said carcass, each of said sidewalls extending from an end of the tread to the bead of the tire, the rubber thickness of each sidewall being at least 10 times the diameter of the ply cords of said carcass;

a pair of bead apexes each disposed radially outside each of said bead cores so as to extend radially outwardly from said bead cores, a radially outward height of the radially outermost end of said bead cores from a heel point of the bead being within a range of 20 to 40% of the section height of the tire; and said beads each having a bead toe disposed axially inward of said bead cores, said bead toe having a protrusion protruding radially inwardly from a bead base defined as a radial inward surface of the bead under the bead core, and each bead being provided with a hump groove between the bead base and the protrusion, said rim having;

a well in the center portion of the rim;

a pair of bead seats one on each side of said well;

a pair of humps each formed axially inward and adjacent to each bead seat to be engaged with said hump grooves of the tire beads; and a pair of grooves each formed axially inward of each hump to receive said protrusions of the tire bead toes;

said bead toe comprising a toe strip made of a hard rubber compound having a JIS A hardness of 65 to 95 degrees, and a height of the toe strip from the bead base being in a range of 120 to 150% of the height of a flange of the rim from the bead base; and said bead having a width in an axial direction being in a range of 2.4 to 2.7 times the width of the bead seat.

10. An assembly as set forth in claim 9, wherein the radially inward height of said protrusion of each tire bead toe from the bead base is in a range of 2 to 5% of the section height of the tire from the bead base.

11. An assembly as set forth in claim 9, wherein the width of the bead seats and the diameter of the rim is set so as to be able to mount a standard tire thereon.

12. An assembly as set forth in claim 9, wherein at least two rubberized parallel ply cords are arranged so that the cords of one ply intersect with those of the other ply.

13. An assembly as set forth in claim 9, wherein the rubber of said sidewalls has an elastic modulus at 100% elongation of more than 12 kg/sq. cm.

14. An assembly as set forth in claim 9, wherein said radially outward height of the radially outermost end of said bead cores from a heel point of the bead is within a range of 20 to 30% of the section height of the tire.

* * * * *